June 16, 1964     R. A. MAROT     3,137,513
WHEEL SUSPENSION SYSTEM FOR VEHICLES
Filed Dec. 19, 1960     2 Sheets-Sheet 1

INVENTOR
R. A. Marot
ATTORNEYS

June 16, 1964  R. A. MAROT  3,137,513
WHEEL SUSPENSION SYSTEM FOR VEHICLES
Filed Dec. 19, 1960  2 Sheets-Sheet 2

INVENTOR
R. A. Marot
By Holcomb, Wethuill & Mullins
ATTORNEYS

United States Patent Office 3,137,513
Patented June 16, 1964

3,137,513
WHEEL SUSPENSION SYSTEM FOR VEHICLES
Robert André Marot, 39 Rue d'Alembert, Villeneuve-St.-Georges, France, assignor of one-half to Pneumatiques et Caoutchouc Manufacture Kleber Colombes, Colombes, France, a French body corporate
Filed Dec. 19, 1960, Ser. No. 76,897
Claims priority, application France Dec. 21, 1959
7 Claims. (Cl. 280—112)

The present invention relates to vehicle suspension systems, particularly for automobiles, and has as an object, improvements therein.

Vehicle suspensions are continuously evolving and being developed because any suspension must take into account the weight and dimensions of the vehicle, its load capacity, the power of its engine and of its braking system, the kind of steering and also the general state of the roads. Due to the many facets of the problem, there have been proposed a large number of solutions which are all more or less the product of a compromise between differing desiderata. By and large the suspension systems currently used are of the mechanical type with or without supplementary stabilizing or damping devices which can be pneumatic, mechanical or hydraulic; some suspension systems are specifically pneumatic or hydraulic. Whatever the solution used, even the best of suspension systems still have serious drawbacks, particularly when cornering, when the vehicle rolls towards the outside of the corner, and this is uncomfortable for the passengers and can lead to serious accidents.

Automobile vehicles have been fitted for a long time with so-called "independently sprung" wheels: this makes a contribution towards the improvement of the comfort and road holding and can be adapted to all types of suspension whether by torsion bars, semi-elliptic springs and wish bones (triangulated lever), swinging half axles and helical springs, or floating axles, the body being fixed upon an axle beam or other transverse member carrying said suspension members. But, with or without damping devices, all these systems suffered from at least some of the above-mentioned drawbacks.

The analysis of the displacement of a vehicle along a curve shows that, even when fitted with the best known suspensions, during cornering and even more clearly when it is travelling at a more lively pace, it undergoes the action of centrifugal force, which tends to displace it in the opposite direction to that of the curve, and it also undergoes the force of inertia which tends to make it pursue its original path. It is known that centrifugal force and inertia are proportional to the weight of the vehicle, to its speed and to the radius of curvature of the bend.

It is a specific object of the invention to provide a vehicle-suspension system which minimises these drawbacks, but which may be fitted without difficulty to conventional vehicles, and allows shock absorbers to be dispensed with if desired but which nevertheless can be made at a cost not exceeding that of conventional suspensions.

To this end, the invention provides a vehicle suspension system having an axle beam or other transverse member, for one or each pair of wheels, articulated by each end to a wheel, in which an articulated bearing rod is also mounted on each end of the transverse member and is joined at one end to a wheel support lever whose other end is articulated to a vehicle wheel, the vehicle body being suspended on pivoting rods respectively mounted on the corresponding bearing rods and a flexible member being interposed between each end of the transverse member and the adjacent wheel support lever.

Each bearing rod may consist of a single lever to one end of which a point of the vehicle body is pivoted and to the other end of which the wheel support lever is articulated, the transverse member being articulated at an intermediate point of the said lever.

Each bearing rod may consist of an assembly of levers, on one of which pivots a point of the vehicle body, the transverse member and the support lever each being articulated to one of the other levers forming said assembly.

The flexible members may be helical springs, in which case they may be stretched and compressed between their attachment point which is pivotable on the transverse member, and their other attachment point on the wheel support lever.

Alternatively the flexible members may be torsion bars which are disposed along the axis of articulation of the wheel support lever on the transverse member.

When at rest the flexible members have their operative axes symmetrically disposed with regard to the longitudinal plane of symmetry of the vehicle, i.e. these axes are inclined at the same angle on both sides of the longitudinal axis of the vehicle. This angle is determined by the shape and dimensions of the wheel support lever, also by the length of the arm of the lever, taken between the articulations on the wheel supporting lever and the transverse member, and finally by the travel allowed for the flexible members.

It is obvious that hydraulic, pneumatic or other devices can also be used singly or together or in combination with the mechanical flexible members referred to above.

In order that the invention may be more clearly understood, reference will now be made to the accompanying drawings which show two specific embodiments thereof by way of example and in which.

Figure 1:
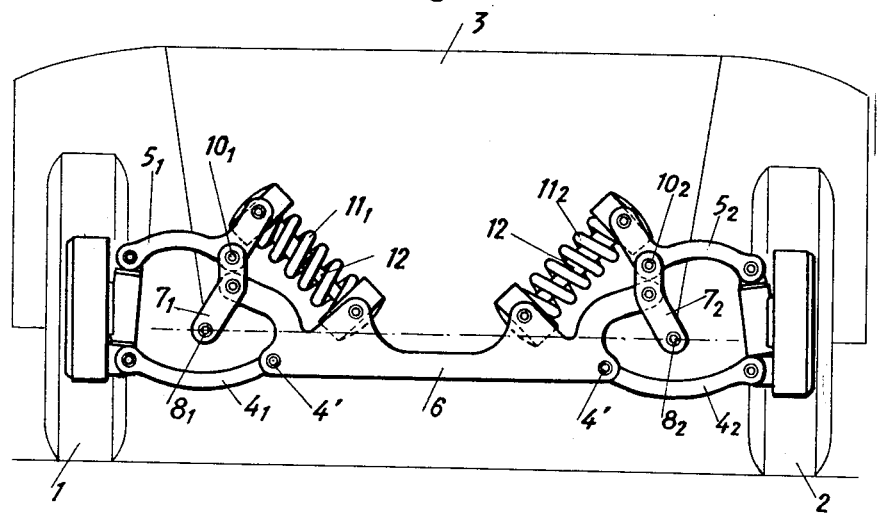
FIGURE 1 shows a front elevation of a first embodiment.
Figure 2:
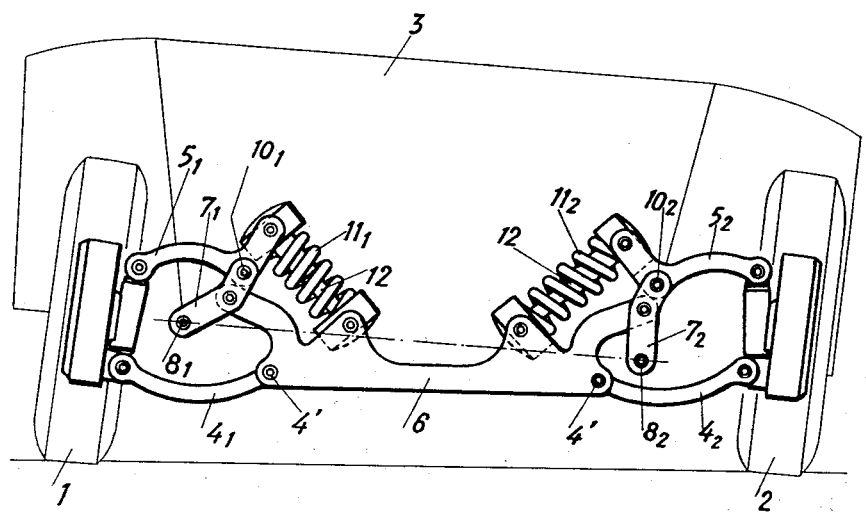
FIGURE 2 shows a front elevation of the position taken up by the device in FIGURE 1 when cornering.

Referring to the embodiment shown in FIGURES 1 and 2, the front wheels 1 and 2 of an automobile vehicle, having a body represented schematically at 3, are supported by lower bearing rods $4_1$, $4_2$ and upper bearing rods $5_1$, $5_2$ articulated in any desired fashion to the corresponding wheel. The lower bearing rods $4_1$, $4_2$ are articulated by their other end 4′ to an axle beam or other transverse member 6. Towards each end of the transverse member 6 there is articulated an angled lever $7_1$, $7_2$, one end of which $8_1$, $8_2$ is pivoted to a point on the body 3 and the other end of which $10_1$, $10_2$ is articulated to the corresponding upper bearing rod $5_1$, $5_2$. Between the said bearing rods $5_1$, $5_2$ and the transverse member 6 are mounted, so that they pivot at their ends, two helical springs $11_1$, $11_2$ preferably provided with a hydraulic shock absorber 12.

The assembly is preferably exactly the same for the rear wheels of the vehicle.

When the vehicle fitted as described is following a straight line, the suspension members occupy the positions shown in FIGURE 1. When the vehicle is entering a curve to the right, the lever $7_1$ is pushed back towards the left of the drawing; thus the spring $11_1$, is compressed, i.e. it shortens, between the bearing rod $5_1$ and the transverse member 6, and also the wheel 1 inclines towards the right. At the same time the lever $7_2$ stretches the spring $11_2$ between the bearing rod $5_2$ and the transverse member 6 and causes the wheel 2 to incline towards the right but at a smaller angle of inclination than that of the wheel 1. The body 3 is thus inclined towards the centre of the curve, while lowering the centre of gravity in the same direction. Therefore the effects of centrifugal force on the passengers is diminished, compared with conventional vehicles and on the other hand road holding is improved since the wheels, in sloping, in fact grip the ground, thus avoiding any tendency to skid.

Figure 3:
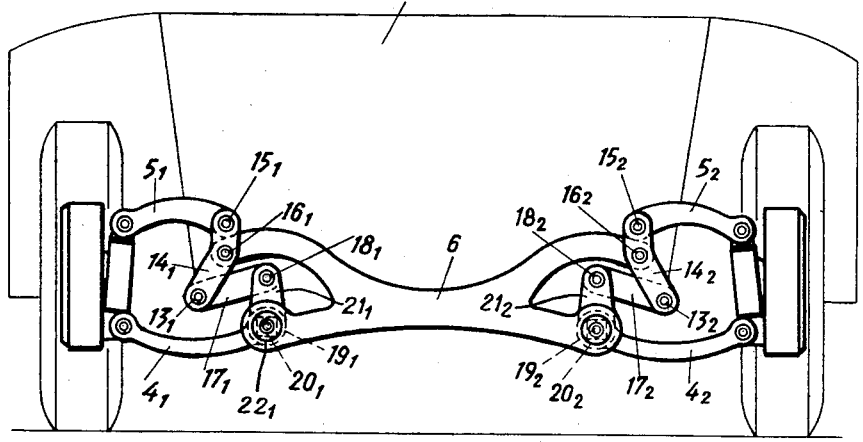
FIGURES 3 and 4 show front elevations, corresponding respectively to FIGURES 1 and 2, of a modification in which the flexible members are torsion bars.
Figure 4:
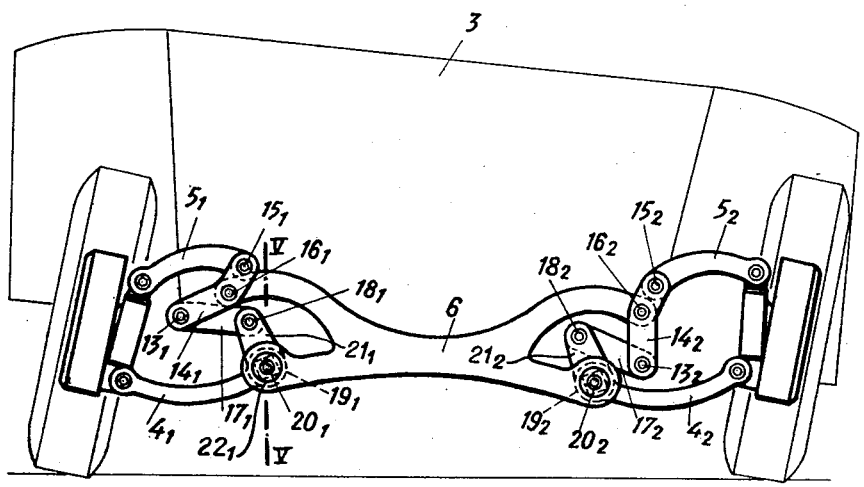
Figure 5:
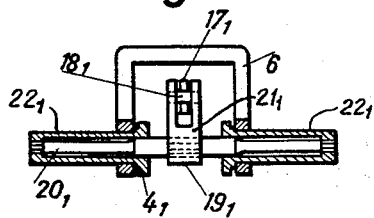
FIGURE 5 shows a section on a large scale along the line V—V of FIGURE 4.

Referring now to FIGURES 3, 4 and 5, the body 3 is pivoted to the ends $13_1$, $13_2$ of levers $14_1$, $14_2$ which are articulated at their other ends $15_1$, $15_2$ on the upper bearing rods $5_1$, $5_2$ and at intermediate points $16_1$, $16_2$ on the transverse member 6. Two links $17_1$, $17_2$ are articulated at their one ends to the ends $13_1$, $13_2$ of the levers $14_1$, $14_2$ and at their other ends to the ends $18_1$, $18_2$ of levers $21_1$, $21_2$, the other ends $19_1$, $19_2$ of which are connected to the transverse member 6 through torsion bars $20_1$, and $20_2$ coaxial with the articulations of the lower bearing rods $4_1$, $4_2$.

Referring particularly to FIGURE 5, the end $19_1$ of the lever $21_1$ is fixed to the middle of the torsion bar $20_1$ and opposite end portions of the torsion bar are mounted respectively in two tubular bearings $22_1$. The opposite ends of the torsion bar are fixed to the ends of the bearings remote from the lever $21_1$ whilst adjacent the lever the bar is rotatable relatively to the bearings. The tubular bearings $22_1$ are an integral part of the lower bearing rod $4_1$, which is bifurcated at its end adjacent the transverse member 6, and are pivotally mounted in spaced portions of the member 6, which is also bifurcated at this position, in order to articulate the bearing rod $4_1$ to the transverse member.

The lower bearing rod $4_2$ and the lever $21_2$ are coupled to the transverse member 6 in the same manner as the rod $4_1$ and the lever $21_1$.

The action of the embodiment illustrated in FIGURES 3, 4 and 5 is the same as that of FIGURES 1 and 2.

Thus it may be seen that the suspension system according to the present invention has as its practical effect, by the use of centrifugal forces and of inertia, the hardening of the suspension springs in the opposite direction to the direction of the bend and at the same time has the effect of inclining the wheels in the direction of the bends. Thus it offers the advantage which has been sought for a long time, but not yet obtained in such a simple way, of almost entirely eliminating the risks of turning over or skidding due to undesirable reactions in the known flexible suspensions when corners are taken at great speed. Thus it allows faster cornering with more safety and comfort without losing the vehicle's comfortable "feel" when travelling in a straight line or over bad roads. Finally it can be adapted without particular difficulty to vehicles which are already in service or to vehicles under construction.

I claim:

1. In a vehicle, the combination comprising a vehicle body, a pair of wheels, an axle beam, first articulating means connecting the ends of said axle beam to said wheels respectively, second articulating means for each wheel connecting it to said axle beam, said second articulating means including a bearing rod articulated to said wheel and a lever member articulated to said bearing rod, pivot means pivoting each lever member to said axle beam, means connecting each lever member to said vehicle body on the side of said pivot means remote from the associated bearing rod, and means including resilient means connecting each second articulating means to said axle beam.

2. In a vehicle, the combination comprising a vehicle body, a pair of wheels, an axle beam, first articulating means connecting the ends of said axle beam to said wheels respectively, a bearing rod articulated to said wheel and a lever member articulated to said bearing rod, pivot means pivoting each lever member to said axle beam, means connecting each lever member to said vehicle body on the side of said pivot means remote from the associated bearing rod, and means including resilient means connecting said axle beam to a point on each lever arm spaced from said pivot means.

3. A vehicle as claimed in claim 1 in which said means including resilient means is connected to said lever member on the same side of said pivot means as said vehicle body.

4. In a vehicle, the combination comprising a vehicle body, a pair of wheels, an axle beam, two bearing rods respectively articulated to the ends of said beam, means articulating said bearing rods to said wheels respectively, two further bearing rods, means articulating one end of said further bearing rods to said wheels respectively, two lever members respectively articulated at one of their ends to said further bearing rods, said lever members being connected adjacent their ends remote from said further bearing rods to said vehicle body and being articulated intermediate their ends to said axle beam, and means including resilient means connecting each lever member to said axle beam.

5. In a vehicle, the combination comprising a vehicle body, a pair of wheels, an axle beam, first articulating means connecting the ends of said axle beam to said wheels respectively, second articulating means connecting the ends of said axle beam to said wheels, said second articulating means including two bearing rods respectively articulated at one of their ends to said wheels, and two lever members respectively articulated to said bearing rods adjacent the other ends thereof, each lever member being connected at a point remote from its associated bearing rod to said vehicle body and being articulated intermediate said point and said associated bearing rod to said axle beam; and resilient means connected between said axle beam and the said other ends of said bearing rods.

6. In a vehicle, the combination comprising a vehicle body, a pair of spaced wheels, an axle beam, two bearing rods respectively articulated to the ends of said beam, means articulating said bearing rods to said wheels respectively, two further bearing rods, means articulating one end of said further bearing rods to said wheels respectively, two lever members respectively articulated at one of their ends to said further bearing rods adjacent the other ends of said rods, said lever members being connected at their ends remote from said further bearing rods to said vehicle body and being articulated intermediate their ends to the ends of said axle beam, and a helical spring interposed between said axle beam and each said other end of said further bearing rods.

7. In a vehicle, the combination comprising a vehicle body, a pair of spaced wheels, an axle beam, two bearing rods respectively articulated to the ends of said beam, means articulating said bearing rods to said wheels respectively, two further bearing rods, means articulating one end of said further bearing rods to said wheels respectively, two lever members respectively articulated at one of their ends to the other ends of said further bearing rods, said lever members being connected at their ends remote from said further bearing rods to said vehicle body and being articulated intermediate their ends to the ends of said axle beam, and a torsion bar adjacent each end of said axle beam, each torsion bar being operatively connected to the end of the adjacent lever member articulated to the vehicle body by means including a link articulated to said end of said adjacent lever member.

References Cited in the file of this patent

UNITED STATES PATENTS 2,106,291    Allison _____ Jan. 25, 1938
2,978,255    Rosenkrands _____ Apr. 4, 1961